June 5, 1951  J. A. NEGIN ET AL  2,556,101
BODY ATTACHMENT FOR JEEPS
Filed Sept. 28, 1946  2 Sheets-Sheet 1

INVENTORS.
JULIUS A. NEGIN
LUDWIG J. GASPAR, JR.
BY William Iseler
ATTORNEY

June 5, 1951          J. A. NEGIN ET AL          2,556,101

BODY ATTACHMENT FOR JEEPS

Filed Sept. 28, 1946          2 Sheets-Sheet 2

INVENTORS.
JULIUS A. NEGIN
LUDWIG J. GASPAR, JR.

BY *William Seiler*

ATTORNEY

Patented June 5, 1951

2,556,101

UNITED STATES PATENT OFFICE 2,556,101

BODY ATTACHMENT FOR JEEPS

Julius A. Negin, East Cleveland, and Ludwig J. Gaspar, Jr., Cleveland, Ohio, assignors of one-half to William Isler, Cleveland, Ohio Application September 28, 1946, Serial No. 700,006

11 Claims. (Cl. 296—28)

This invention relates, as indicated, to body attachments for vehicles of the type known as Jeeps.

As is well known, this type of vehicle, which was developed and extensively used during World War II, is coming into general usage for commercial purposes, but its use for such purposes is somewhat limited on account of its body shape and dimensions.

Another factor which has inhibited the use of this type of vehicle for commercial purposes is the fact that the spare tire or spare wheel of the vehicle is conventionally carried at the side of and adjacent the rear end of the body of the vehicle, in which position, it is so remote from the plane defined by the wheels of the vehicle as to constitute a hazard, particularly when attempting to park the vehicle in city streets.

The present invention has as its primary object the provision of an attachment or extension for the body of a vehicle of this type, which attachment or extension materially increases the carrying capacity of the vehicle.

Another object of the invention is the provision of an attachment or extension of the character described, which can be easily and quickly attached to the vehicle without the use of tools other than simple tools, such as a screw driver or wrench.

A further object of the invention is the provision of an attachment or extension of the character described which utilizes as a part thereof the existing tail gate of the vehicle.

A still further object of the invention is the provision of an attachment or extension of the character described which also functions to support the spare tire or spare wheel of the vehicle in such a manner as to eliminate the parking hazard to which reference has been made.

A still further object of the invention is to provide an attachment or extension of the character described which is of simple, rugged construction, and which can be manufactured in commercially desirable quantities rapidly and at low cost.

Other objects and advantages of the invention will be apparent during the course of the following description.

In the accompanying drawings, forming a part of this specification, and in which like numerals are employed to designate like parts throughout the same, Fig. 1 is a rear elevational view of a vehicle of the Jeep type, showing the tail gate of the vehicle and the manner in which the spare wheel is conventionally carried by the body of the vehicle;

Figure 1:
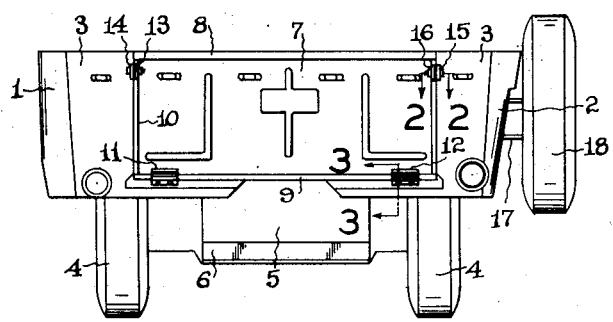
Figure 3:
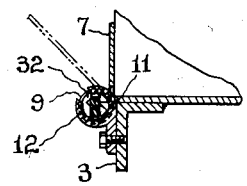
Fig. 3 is a fragmentary cross-sectional view, taken on the line 3—3 of Fig. 1.
Figure 2:
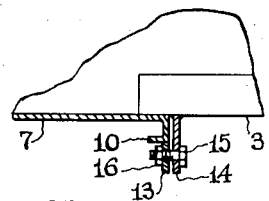
Fig. 2 is a fragmentary cross-sectional view, taken on the line 2—2 of Fig. 1.
Figure 4:
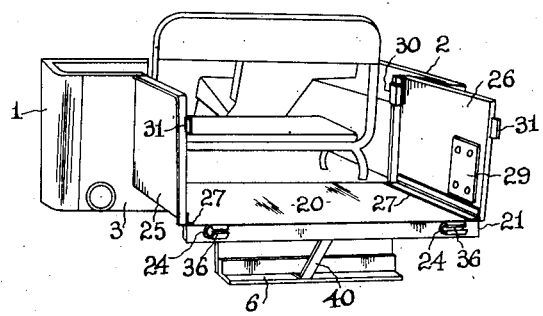
Fig. 4 is a fragmentary perspective view of the rear portion of the vehicle, showing the conventional tail gate of the vehicle removed and the attachment or extension of the present invention mounted on the body of the vehicle, but prior to the attachment of the said tail gate to the extension.

Referring more particularly to Figs. 1, 2 and 3 of the drawings, there is disclosed a vehicle of the Jeep type comprising a body having sides 1 and 2, and a rear wall 3, the body being supported by wheels 4. The body structure supports a plate 5 which is disposed substantially in the plane of the rear 3 of the body, and to which an angle 6, which serves a purpose to be presently described, is welded or otherwise rigidly secured.

The body of the vehicle further includes a tail gate 7. This tail gate is formed from sheet steel, and is provided at its upper edge with a cylindrical or roll flange 8, which serves as a reinforcement, and at its bottom edge with a roll flange 9 similar to the flange 8, and at its side edges with rebent flanges 10, which also serve to reinforce the tail gate.

Portions of the flange 9 are removed adjacent the ends of the flange in order to provide gaps across which plates 11 extend, these plates normally lying within supporting clips 12, which are of substantially the same cross-section as the flange 9 and are bolted to the rear 3 of the vehicle body, as best shown in Fig. 3. The clips 12 fill the spaces provided by removal of portions of the flange 9 and appear to form parts of the flange 9. The clips 12, as will be apparent, serve to support the tail gate in the normal or closed position of the tail gate, and, by reason of the fact that they virtually surround the plates 11, serve to prevent displacement of the lower portion of the tail gate from the rear 3 of the body. Lateral displacement of the tail gate is prevented by reason of the fact, as stated, that the clips 12 fill the spaces provided by removal of portions of the flange 9.

The upper portion of the tail gate 7 is provided at its side edges with lugs or ears 13 having openings adapted to be aligned with similar openings in lugs or ears 14 which are attached to and extend rearwardly from the rear 3 of the vehicle body, so that when the openings in the respective lugs are thus aligned, bolts 15 may be passed through the aligned openings and held in place by nuts 16. This locks the tail gate in its normal position on the vehicle body.

Secured to the side 2 of the vehicle body, adjacent the rear of said side is a carrier 17 which serves as a support for the spare wheel or spare tire 18, with which vehicles of this type are usually provided.

This spare wheel or tire, as will be readily apparent from Fig. 1 of the drawings, is so located, i. e., at such a remote point from the plane in which the right wheels 4 of the vehicle are disposed, as to constitute an extremely serious hazard. Its position or location is such that it can be easily sideswiped by passing vehicles, with resultant damage not only to the spare wheel or to the vehicle which carries the spare wheel, but to the passing vehicle as well. Moreover, when the vehicle is parked, particularly in a city street, the wheels 4 must necessarily be brought close to and parallel with the curb, and when this has been successfully accomplished, the spare wheel 18 overhangs the sidewalk to such an extent as to constitute a hazard and serious impediment to pedestrians on the sidewalk. In some cities, the extent of this overhang is controlled by ordinances. Furthermore, the movements of the spare wheel 18, during the mere act of parking the vehicle, are such as to constitute a hazard to pedestrians as well as to private property, such as telephone poles, lighting standards, etc.

The body attachment or extension which forms the subject of the present invention is best shown in Figs. 4 to 12 inclusive of the drawings.

It comprises a bottom member 20, formed of sheet metal, and having welded to its lower surface, adjacent its rear edge, a reinforcing angle 21, and welded to its lower surface at a point spaced from its front edge, a second reinforcing angle 22. Forwardly of the reinforcing angle 22, the bottom 20 has welded thereto, at points spaced to correspond with the spacing of the clips 12, a pair of plates 23, which are similar to the plates 11 of the tail gate 7. The reinforcing angle 21 has bolted thereto, at points spaced to correspond with the spacing of the clips 12 of the tail gate, clips 24 which are similar to the clips 12.

Figure 6:
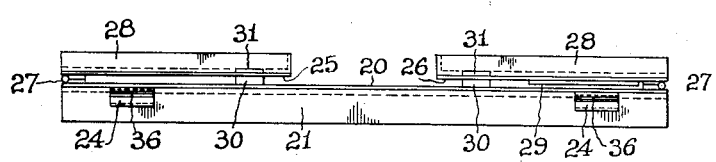
Fig. 6 is a view showing the manner in which the body attachment or extension is folded when not in use.
Figure 7:
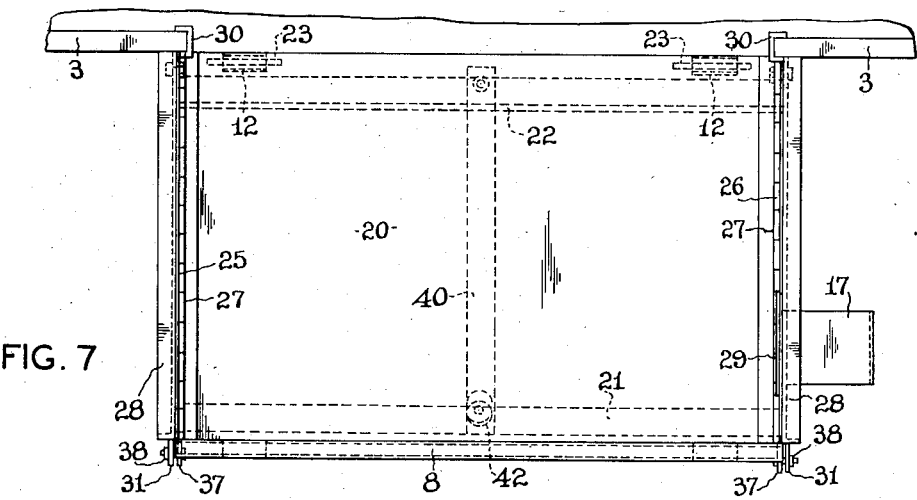
Fig. 7 is a fragmentary plan view, showing the body extension of the present invention mounted on the vehicle.
Figure 8:
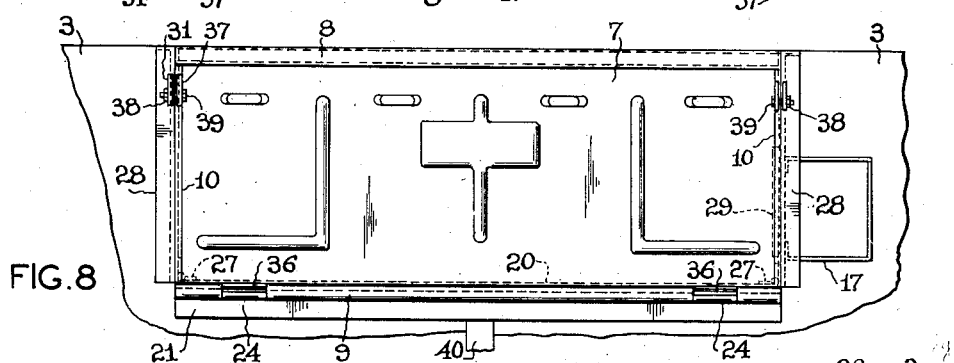
Fig. 8 is a fragmentary rear elevation showing the body extension.

The attachment or extension further includes sides 25 and 26, also formed of sheet metal, these being pivotally secured to the margins of the bottom member 20 by means of piano type hinges 27, which permit the sides 25 and 26 to be folded inwardly over the bottom and into parallelism with such bottom, as clearly shown in Fig. 6. In such folded condition, the attachment can be readily carried in the vehicle, when not in use, and can be shipped and stored in a minimum of space.

The sides 25 and 26 have their upper and rear edges reinforced by means of reinforcing angles 28, and the side 26 has secured thereto a plate 29, which serves to reinforce that portion of the side 26 to which the carrier or support 17 for the spare wheel or spare tire 18 is secured. This carrier or support 17, it may be noted, is the same carrier or support which was mounted on the side 2 of the vehicle.

Figure 12:
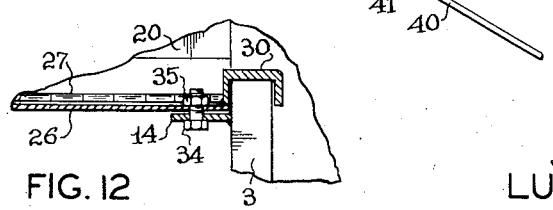
Fig. 12 is a fragmentary cross-sectional view, taken on the line 12—12 of Fig. 9.

The sides 25 and 26 also have welded to the forward edges thereof, adjacent their upper ends, U-shaped clips 30, which, as shown in Fig. 12, are adapted to embrace the edges of the opening in the rear wall 3 of the vehicle body from which the tail gate has been removed.

The sides 25 and 26 also have welded or otherwise secured to the flanges 28 thereof, rearwardly extending lugs or ears 31 which lie in substantially the same plane as the lugs or ears 14, and which serve a purpose to be presently described.

In attaching the attachment or extension to the vehicle body, the tail gate 7 is first removed from the vehicle. This is accomplished by removing the bolts 15 from the lugs 13 and 14, and then swinging the gate to the position shown in broken lines in Fig. 3, in which position, the plates 11 are brought into alignment with openings 32 in the clips 12, permitting the plates to be withdrawn through such openings.

Figures 10, 11:
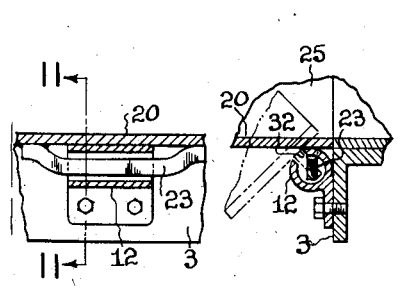
Fig. 10 is a fragmentary cross-sectional view, taken on the line 10—10 of Fig. 9.
Fig. 11 is a fragmentary cross-sectional view, taken on the line 11—11 of Fig. 10.
Figure 9:
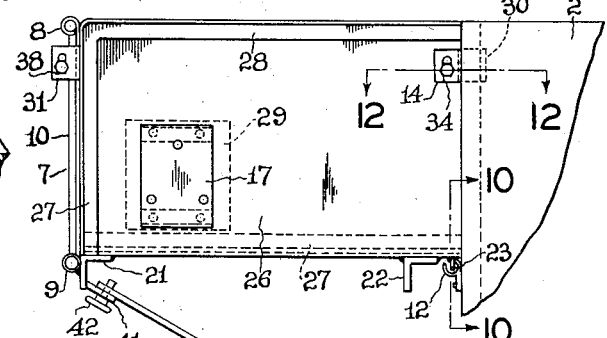
Fig. 9 is a fragmentary elevational view of the right side of the body extension.

The body attachment or extension is then attached to the vehicle body by first entering the plates 23 through the openings 32 in the clips 12, and then rotating the plates 23 in such clips till they assume the vertical position shown in solid lines in Figs. 10 and 11. At the same time, the sides 25 and 26 are unfolded to a vertical position, the clips 30 embracing the edges of the opening in the rear wall 3 of the vehicle body from which the tail gate 7 has been removed, as clearly shown in Fig. 12.

In order to lock the sides 25 and 26 in their vertical position, bolts 34 are inserted through the openings in the lugs 14 (see Fig. 12) and through openings in the sides 25 and 26 which are in alignment with the openings in the lugs, and nuts 35 are secured to these bolts to hold them in place.

It will be apparent from the foregoing that the lower portion of the body attachment is not only supported by but locked against displacement from the vehicle body by the clips 12, and that the upper portion of the body attachment is locked against displacement from the vehicle body not only by virtue of the fact that the clips 30 embrace the portions of the vehicle body, but by reason of the fact that the bolts engage portions of the vehicle body as well as the attachment.

The tail gate 7, which was previously removed, is then attached to the body extension or attachment in the following manner:

The plates 11 of the tail gate are first entered through the openings 36 in the clips 24, and the plates 11 then turned to a vertical position, which brings the tail gate to a vertical position, and the openings in lugs 37 into alignment with the openings in lugs 31. The bolts 38 are then inserted through the aligned openings in said lugs, and the nuts 39 then attached to these bolts to secure the bolts in place. In this manner, the tail gate is locked against displacement from the body extension in the same manner in which it was originally attached to the vehicle body.

An extension of the aforesaid character takes only about three minutes to attach to the vehicle, and adds from six to seven square feet of floor space to the carrying capacity of the vehicle, it being noted that the member 20 of the extension is substantially flush with the floor of the vehicle.

In order to provide additional support for the body extension, a brace bar 40 may be employed, this bar being secured at one end to the angle 6 on the vehicle body, and being secured at its other end to a lug 41, welded to the vertical flange of the angle 21, as by means of a screw bolt 42.

Figure 5:
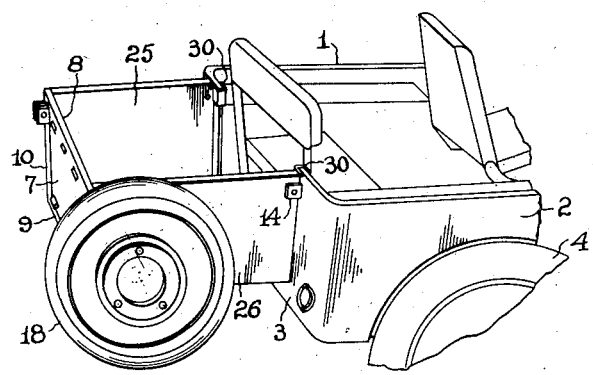
Fig. 5 is a fragmentary perspective view of the rear portion of the vehicle with the body extension in place thereon and the tail gate attached to the extension, and showing also the manner in which the spare wheel is carried by the body extension.

After the body extension has been secured to the vehicle, the spare wheel carrier 17 is transferred from its conventional position or location shown in Fig. 1, to that shown in Fig. 5. In this position, the spare wheel or tire 18 is disposed in a plane which nearly coincides with the plane of the right wheels 4 of the vehicle, and does not constitute a hazard as hereinbefore described.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In combination with a vehicle of the character described having a bottom and a substantially vertically extending rear wall having an opening therein defined by side edges and a bottom edge; spaced hollow supporting clips secured to said vehicle adjacent said bottom edge of said opening, a body extension supported in part by said clips, said extension comprising a bottom member which is substantially coplanar with the bottom of said vehicle, plates secured to said bottom member adjacent the forward edge thereof, said plates spaced to correspond with the spacing of said clips, and disposed in said clips, said extension further including vertical sides substantially in alignment with the side edges of said opening and pivotally secured to said bottom member, and a substantially vertical tail gate removably secured to said extension at the rear thereof.

2. In combination with a vehicle of the character described having a bottom and a substantially vertically extending rear wall having an opening therein defined by side edges and a bottom edge; spaced supporting clips secured to said vehicle adjacent said bottom edge of said opening, said clips having portions of substantially circular cross-section, a body extension supported in part by said clips, said extension comprising a bottom member which is substantially coplanar with the bottom of said vehicle and vertical sides substantially in alignment with the side edges of said opening and pivotally secured to said bottom member, plates secured to said bottom member adjacent the forward edge thereof and spaced to correspond with the spacing of said clips, said plates having flat portions disposed within the substantially-circular portions of said clips.

3. The combination, as defined in claim 2, in which a substantially-vertical tail gate is removably secured to said extension.

4. The combination, as defined in claim 2, in which the circular portions of said clips have openings in the wall thereof adapted to be entered by the flat portions of said plates when the latter are in an inclined position, said flat portions of said plates occupying a substantially vertical position when the body extension is mounted on said vehicle.

5. The combination, as defined in claim 2, in which clips similar to those defined and similarly spaced are secured to said body extension adjacent the rear thereof, and a tail gate is provided having plates similar to those defined and similarly spaced, said plates on said tail gate disposed within said clips adjacent the rear of said body extension, whereby said tail gate is supported on said body extension, said tail gate being of substantially the same contour as said rear wall opening, whereby said tail gate will fit either on the body or body extension of the vehicle.

6. The combination, as defined in claim 2, in which said sides are provided at their forward edges with U-shaped clips which embrace the side edges of said opening, the open ends of said clips facing the sides of said vehicle.

7. A body extension for a vehicle of the character described which normally is provided with a removable end gate, said extension comprising a bottom member disposed in a substantially horizontal plane, spaced plates having vertical flat portions secured to said bottom member adjacent the forward edge thereof and adapted for connection to the rear of a vehicle body in place of said end gate, and clips secured to said bottom member adjacent the rear thereof adapted to receive said end gate, said clips spaced to correspond with the spacing of said plates and having portions of substantially-circular cross section disposed rearwardly of the rear edge of said bottom member.

8. A body extension, as defined in claim 7, in which the circular portions of said clips have openings in the wall thereof.

9. A vehicle construction comprising a vehicle body having a rear end gate opening, an end gate serving as a closure for said opening, a body extension unit adapted to form an extension of the body rearwardly from said opening, said body extension comprising a bottom member and sides pivotally secured to the marginal edges of said member, said sides being foldable inwardly into parallelism with said bottom member, disconnectable hinge means between the front end of said extension unit and said end gate opening, and similar disconnectable hinge means between said end gate and the rear end of said extension unit permitting interposition of said unit as a body extension between said opening and said end gate.

10. A body extension accessory for a vehicle body having an end gate opening and hinge elements for a removable end gate member, comprising an extension unit adapted to form an extension of the body rearwardly from the end gate opening, said unit including a bottom member and sides pivotally secured to the marginal edges of the bottom member, said sides being foldable inwardly into parallelism with said bottom member, the front end of said unit being provided with hinge elements adapted for removable connection with said first hinge elements and the rear end of said unit having hinge elements adapted for removable connection with said end gate member thereby permitting interposition of said unit as a body extension accessory between the end gate and the end gate opening.

11. A vehicle construction comprising a body having a rear end gate opening, an end gate serving as a closure for said opening, said body and end gate having disconnectable hinge elements permitting removal of the end gate, a body extension accessory unit adapted to form an extension of the body rearwardly from said opening, said unit including a bottom and sides pivotally secured to the margins thereof, said sides being foldable inwardly into parallelism with said bottom, the front end of said unit having hinge elements adapted for removable connection with the hinge elements of said body and the rear end of said unit also having hinge elements adapted for removable connection with the hinge elements of said end gate thereby permitting interposition of said unit as a body extension accessory between the end gate and end gate opening, and latching means for latching said end gate member in closure relation at either said end gate opening or at the rear end of said extension unit.

JULIUS A. NEGIN.
LUDWIG J. GASPAR, JR.

REFERENCES CITED

The following references are of record in the file of this patent:

UNITED STATES PATENTS

| Number | Name | Date |
|---|---|---|
| Re. 14,500 | Heath | Aug. 6, 1918 |
| 477,988 | Butler | June 28, 1892 |
| 750,376 | Lampitt | Jan. 26, 1904 |
| 808,395 | Luscombe | Dec. 26, 1905 |
| 1,415,244 | Kennedy | May 9, 1922 |
| 1,588,740 | Johnson | June 15, 1926 |
| 1,755,543 | Hill | Apr. 22, 1930 |
| 1,838,344 | Wilson | Dec. 29, 1931 |
| 1,915,114 | Awes | June 20, 1933 |
| 1,994,399 | Moreau | Mar. 12, 1935 |

FOREIGN PATENTS

| Number | Country | Date |
|---|---|---|
| 177,618 | Great Britain | Apr. 6, 1922 |